United States Patent [19]

Aulich et al.

[11] Patent Number: 4,803,188

[45] Date of Patent: Feb. 7, 1989

[54] HETEROGENEOUS CATALYST CONTAINING SILICON DIOXIDE

[75] Inventors: Hubert Aulich; Hans-Peter Urbach, both of Munich; Karl-Heinz Eisenrith, Schliersee, all of Fed. Rep. of Germany

[73] Assignee: Siemens Aktiengesellschaft, Berlin and Munich, Fed. Rep. of Germany

[21] Appl. No.: 142,203

[22] Filed: Jan. 11, 1988

[30] Foreign Application Priority Data

Jan. 27, 1987 [DE] Fed. Rep. of Germany ....... 3702363

[51] Int. Cl.$^4$ .......................... B01J 37/00; B01J 21/06
[52] U.S. Cl. ..................................... 502/232; 502/408; 502/439
[58] Field of Search ..................... 502/3, 408, 439, 232

[56] References Cited

U.S. PATENT DOCUMENTS

| | | | |
|---|---|---|---|
| 2,315,329 | 3/1943 | Hood et al. | 502/439 |
| 3,406,120 | 10/1968 | Hagemeyer et al. | 502/408 |
| 3,721,632 | 3/1973 | Miller et al. | 502/3 |
| 3,948,759 | 4/1976 | King et al. | 502/3 |

OTHER PUBLICATIONS

Roempps Chemie-Lexikon (edited by O. A. Neumueller) 8th Edition, Stuttgart, vol. 3, pp. 2052-2058.
Ser. No. 142,202, 1-11-88, Aulich et al.

*Primary Examiner*—Carl F. Dees
*Attorney, Agent, or Firm*—Hill, Van Santen, Steadman & Simpson

[57] ABSTRACT

The present invention provides a heterogeneous catalyst based on silicon dioxide, as well as, a method for manufacturing same. The catalyst of the present invention is constructed from a porous material produced from large-surface glass bodies containing catalytically active additives by leaching with mineral acid and the additives are incorporated into the network of the glass body in the form of metal oxides insoluble in hot mineral acid. The catalyst exhibits a high active surface and is universally employable because it contains only a slight amount of undesired impurities, is highly reactive, and has a high structural stability up to about 1000° C.

20 Claims, No Drawings

HETEROGENEOUS CATALYST CONTAINING SILICON DIOXIDE

BACKGROUND OF THE INVENTION

The present invention relates generally to catalysts. More specifically, the present invention relates to a heterogeneous catalyst based on silicon dioxide and a method of manufacturing same.

Heterogeneous catalysts are substances that increase the reaction speed of a chemical reaction. Heterogeneous catalysts proceed unmodified therefrom and are not present in the same phase as the substrates that are reacting.

Typically, the heterogeneous catalysts are in a solid state. Due to the solid phase of the heterogeneous catalysts, they are usually used with reactants that are in a liquid or gaseous phase. These solid heterogeneous catalysts are particularly easy to manipulate and can be easily separated from the reaction product and, therefore, are reusable.

Heterogeneous reactions only occur at the phase boundary surfaces of the phases containing the reaction components. Given a solid catalyst and a liquid or gaseous substrates, therefore, the free surface of the catalyst that is available greatly influences the reaction speed. Accordingly, in order to further accelerate heterogeneously catalyzed reactions, it is necessary to create a catalyst having as large a surface area as possible.

Naturally occurring, porous materials, such as, for example, diatomaceous earth, bentonites, silica gel, pumice, aluminum silicates, zeolites, or aluminum oxide, have been used as catalysts for some fields of application. These materials are available as raw material, as may be derived, for example, from Roempps Chemie-Lexikon, edited by O.-A. Neumueller, 8th Edition, Stuttgart 1983, Volume 3, pages 2052–2058.

Although these initial materials can be utilized as catalysts for some fields of application, due to the acidic properties of the free Si-OH groups, materials containing silicon dioxide are utilized as acid/base catalysts. The acidic character of the catalyst material can be further varied by additives of suitable metal oxides, such as, for example, aluminum oxide, magnesium oxide, etc. In the reduction-oxidation catalysts, the easily reducible or unstable oxides of transition metals, such as for example, metals of the sub-groups 7a, 8 and 1b of the periodic table (for example, iron, copper, nickel, etc.) form the catalytically active components.

Precipitation or impregnation methods are utilized for applying the catalytically active component to the carrier material. The catalytically active component, or a preliminary stage which can be converted thereinto, is fixed on the base member through a liquid phase (e.g., solution or melt). This can proceed both via a purely physical coating of the surface as well as via a chemical bonding, preferably with free Si-OH groups given silicon dioxide.

When the catalytically active component is fixed in the form of a preliminary stage, then an activation must also proceed. This can be a high-temperature step utilizing oxidizing or reducing conditions (e.g., $O_2$ or $H_2$ atmosphere).

Although these silicon dioxide containing catalyst systems are desirable, they suffer certain disadvantages. Silicon dioxide containing catalyst systems that are based on naturally occurring initial materials exhibit a relatively high degree of impurities. This makes the catalyst difficult, if not impossible, to use in many applications. A pure silicon dioxide is therefore usually preferred.

Silicon dioxide can be produced synthetically. However, synthetically produced silicon dioxide material which, for example, is produced from water glass or by flame hydrolysis of organic or inorganic compounds containing silicon exhibits high impurity and is too expensive to create when compared to natural material.

There is therefore a need for an improved heterogeneous catalyst that is based on silicon dioxide.

SUMMARY OF THE INVENTION

The present invention provides an improved heterogeneous catalyst based on silicon dioxide and emthod of making same.

The heterogeneous catalyst based on silicon dioxide of the present invention is constructed so that it can be manufactured in a simple manner from natural raw materials, is highly porous, exhibits no undesirable impurities, and the introduction of the catalytically active component is integrated into the manufacturing process.

The present invention also provides a simple and cost-beneficial process for manufacturing the catalyst from inexpensive initial starting materials. The resultant catalyst has a high porosity and, thus, a large BET surface (following Braunauer, Emmet and Teller) of about 180 $m^2$ per gram. Moreover, the catalyst of the present invention has a low content of impurities, specifically an alkali content below 0.1 weight ppm. Furthermore, the resultant catalyst is a stable meso-porous structure that is largely preserved up to 1000° C.

The present invention also provides a catalyst that is easily grindable and pourable thereby allowing one to create the catalyst in, for example, tablet and briquette form. Due to the construction of the catalyst of the present invention, the OH group density at the surface can be reduced by thermal treatment, and, thus, the acidic character of the catalyst can be varied.

The present invention also provides a catalyst that is porous and produced from large-surface glass bodies containing catalytically active additives by leaching or maceration with mineral acid.

In an embodiment of the present invention, oxides insoluble in hot mineral acid are incorporated into the amorphous network of the glass body as catalytioally active additives. Preferably, these additives are oxides of transition elements.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides an improved heterogeneous catalyst based on silicon dioxide and method of making same. The catalyst is constructed from a porous material that is produced from large-surface glass bodies containing catalytically active additives by leaching with mineral acid.

The catalytically active additives can include metal oxides that are insoluble in hot mineral acid and are incorporated into an amorphous network of the glass body. In a preferred embodiment, the additives are oxides of transition metals.

A method of manufacturing the catalyst of the present invention is also provided. The method includes the steps of providing an initial material containing silicon oxide. The silicon oxide containing material is converted into a homogeneous glass phase by melting with a glass forming additive of aluminum oxide and carbonates and/or oxides of alkaline metals and alkaline earth metals and catalytically active additives of metal oxides insoluble in hot mineral acid. This results in the production of large-surface glass bodies from the glass melt. The resultant glass bodies are then subjected to leaching in hot mineral acid. The resultant porous material is then washed until it is acid free.

The technologically interesting zeolites can be produced by suitable additives, particularly aluminum oxide.

In addition to the oxides that are thermally integrated in the $SiO_2$ network, further catalytically active components can be chemically bonded to free SiOH groups or can be applied to the surface of the catalyst material via an impregnation method.

The catalyst can be universally utilized because of its high purity, its high reactivity, and its optimum structural stability.

Given reducing-oxidizing catalysts, an activation may be necessary, this, for example, potentially being composed of a thermal reduction of the metal oxides with hydrogen gas.

By way of example, and not limitation, an example of the method for making the catalyst of the present invention will now be given.

Mined silica sand is utilized as a starting material. In addition to glass-forming additives of aluminum oxide and carbonates of alkaline metals and alkaline earth metals, the desired catalytically active metal oxides (for example, iron oxide, zinc oxide, etc.) are added to the sand. The resultant mixture is then melted into a homogeneous glass phase. The mixture is such that the resultant melt is approximately 50 to about 70 weight percent $SiO_2$.

In order to manufacture a glass body having a large surface, the melt is converted into fiber form; the diameter of the fibers are preferably less than approximaely 500 $\mu$m. The glass-forming additives and the remaining impurities are leached out in hot mineral acid, preferably approximately 3 to about 6 n hydrochloric acid, preferably at a temperature of at least 95° C. After the leaching step, the fibers are subsequently washed until they are acid-free.

Because the catalytically active metal oxides are thermally integrated into the $SiO_2$ network, they are not dissolved by the hot acid. The resultant product is a fibrous, porous silicon dioxide. The resultant product includes only a limited amount of impurities in the parts per million range in addition to the desired metal oxides.

The leached fibers, having a diameter of preferably approximately 5 to about 10 $\mu$m, can be easily ground to a desired density for further processing. For example, if desired, the fibers can be pressed into tablets or briquettes.

It should be understood that various changes and modifications to the presently preferred embodiments described herein will be apparent to those skilled in the art. Such changes and modifications can be made without departing from the spirit and scope of the present invention, and without diminishing its attendant advantages. It is thereby intended that such changes and modifications be covered by the appended claims.

We claim:

1. A heterogeneous catalyst based on silicon dioxide wherein the catalyst is a meso-porous material produced from large-surface glass bodies containing catalytically active additive by leaching with mineral acid, the catalytically active additives including metal oxides insoluble in hot mineral acid incorporated into an amorphous network of the glass body.

2. The catalyst of claim 1 wherein the additives are oxides of transition metals.

3. A method for manufacturing a heterogeneous catalyst based on silicon dioxide comprising the steps of:
   (a) providing a starting material containing silicon oxide;
   (b) converting the silicon oxide material into a homogeneous glass phase by melting with glass-forming additives including catalytically active additives of metal oxides insoluble in hot mineral acid that are incorporated into an amorphous network of the glass;
   (c) creating large-surface glass bodies from the glass melt;
   (d) subjecting the glass bodies to a leaching process in hot mineral acid; and
   (e) washing the resultant meso-porous material.

4. The method of claim 3 including the step of providing mined silica sand as the starting material.

5. The method of claim 3 including the step of converting the starting material into a glass melt having approximately 50 to about 70 weight percent silicon dioxide.

6. The method of claim 4 including the step of converting the starting materials into a glass melt having approximately 50 to about 70 weight percent silicon dioxide.

7. The method of claim 3 including the step of producing the glass bodies of step (c) by manufacturing glass fibers having a uniform diameter below 500 $\mu$m.

8. The method of claim 5 including the step of producing the glass bodies of step (c) by manufacturing glass fibers having a uniform diameter below 500 $\mu$m.

9. The method of claim 7 including the step of producing the glass bodies of step (c) by manufacturing glass fibers having a uniform diameter of approximately 5 to about 10 $\mu$m.

10. The method of claim 8 including the step of producing the glass bodies of step (c) by manufacturing glass fibers having a uniform diameter of approximately 5 to about 10 $\mu$m.

11. The method of claim 6 including the step of producing the glass bodies of step (c) by manufacturing glass fibers having a uniform diameter below 500 $\mu$m.

12. The method of claim 3 including the step of grinding the porous material after step (e) and pressing it into larger-shaped members.

13. The method of claim 4 including the step of grinding the porous material after step (e) and pressing it into larger-shaped members.

14. The method of claim 5 including the step of grinding the porous material after step (e) and pressing it into larger-shaped members.

15. The method of claim 7 including the step of grinding the porous material after step (e) and pressing it into larger-shaped members.

16. The method of claim 11 including the step of grinding the porous material after step (e) and pressing it into larger-shaped members.

17. The product of the process of claim 3.
18. The product of the process of claim 7.
19. The product of the process of claim 12.
20. The product of the process of claim 15.

* * * * *